Patented July 8, 1947

2,423,755

UNITED STATES PATENT OFFICE 2,423,755

BONDING RUBBER TO METAL BY ADHESIVE POLYMER

John D. Calfee, Westfield, and David W. Young, Roselle, N. J., assignors to Standard Oil Development Company, a corporation of Delaware No Drawing. Application November 24, 1943, Serial No. 511,556

13 Claims. (Cl. 154—82)

This invention relates to polymeric materials; relates particularly to polymeric materials which are adherent to metal; and relates especially to the attaching of rubber-like bodies to metal and solid surfaces by cyclicized polymers of substituted pentadienes.

For many purposes it is extremely desirable that rubber should be made to adhere firmly to metal and other solid bodies; and for such purposes as tank linings, solid tires, and the like, the possibility of causing the various rubber materials to adhere firmly to metal is extremely important. To the present, this has been accomplished effectively only by the use of cyclicized natural rubber, none of the other known substances having a reasonable adhesion both to metal and to rubber-like bodies.

According to the present invention, a polymer of a substituted pentadiene is cyclicized, dissolved in suitable solvent, applied to metal or other surface, the solvent volatilized out, and the desired rubber body cured against the cyclicized polymer to adhere the rubber body to the metal.

Thus the invention provides a tie ply of synthetic polymer between a metal or other solid surface and natural rubber and other rubber-like substances. Other objects and details of the invention will be apparent from the following description:

In practicing the present invention, a polymer of a substituted pentadiene substance is prepared. The raw material for this polymer may consist of such substances as 2-methyl pentadiene-1,3 or 2,5-methyl pentadiene 1,3 or 2 methyl 5 ethyl pentadiene-1,3, or the like. This material is cooled to a temperature ranging from −20° C. to as low as −160° C., a temperature between −40° C. and −100° C. being preferred. The diene material may be used as such, or it may be diluted with various diluents or diluent refrigerants such as ethyl or methyl chloride or other alkyl mono or poly halides up to 4 or 5 carbon atoms, or with carbon disulfide or its homologs and analogs or with the lighter petroleum fractions such as liquid propane, butane, pentane, or the like. The olefinic material may be cooled to the desired temperature by the use of a suitable refrigerating jacket which may contain liquid propane or liquid carbon dioxide or liquid ethane or liquid ethylene or even liquid methane. Alternatively, the refrigerant may be added directly to the olefinic material if it is non-reactive with the catalyst; such diluent-refrigerants as liquid propane, liquid ethane, liquid or solid carbon dioxide, liquid ethylene or liquid methane being usable.

The cold mixture is then polymerized by the addition of a Friedel-Crafts catalyst in solution in a low-freezing, non-complex-forming solvent. A preferred form is aluminum chloride in solution in ethyl or methyl chloride or carbon disulfide or its analogs and homologs. Alternatively, the Friedel-Crafts catalyst may consist of any of the Friedel-Crafts active metal halides as disclosed by N. O. Calloway in his article on "The Friedel-Crafts synthesis" printed in the issue of "Chemical Reviews" published for the American Chemical Society at Baltimore in 1935 in volume XVII, No. 3, the article beginning on page 327, the list being particularly well shown on page 375. The catalyst may be used as the simple active metal halide, or it may be modified in various ways by the addition of small amounts of hydration or the substitution of a hydroxyl group for a halide group, or the substitution of an alkoxide group for the halide group or it may be used in the form of the double halide, one or more metals being used with more than one halide. The modified catalysts are particularly advantageous because of their higher solubility.

For the solvent any of the mono or poly alkyl halides having freezing points below 0° C. may be used. This includes many of the alkyl halides having less than 5 carbon atoms. The solvent also may include carbon disulfide and its analogs and homologs; that is, the solvent may be a carbon compound containing as a substituent a non-metallic acid-forming element selected from groups 6 and 7 of the periodic table. Alternatively, especially with the modified catalysts, various of the simple hydrocarbons may be used as solvents.

The polymerization is conducted by adding the catalyst solution to the olefinic material in any convenient way. The catalyst solution may be sprayed in a condition of fine sub-division onto the surface of the rapidly stirred olefinic material; or the catalyst solution may be delivered in the form of a jet into a high turbulence zone in the olefinic material, or it may be added by any other means which obtains a rapid dispersion of the catalyst solution into the olefinic material.

The polymerization proceeds promptly to yield the desired high molecular weight polymer and the polymerization may be carried practically to 100% conversion or may be stopped at points short of 100% conversion, according to the molecular weight desired and the permissible range of molecular weight in the finished polymer.

The resulting polymer has a molecular weight ranging from 20,000 to 150,000 or higher up to about 500,000 (as determined by the Staudinger viscosity method); and may have an iodine number of approximately 322 (as determined by the Wijs method). The resulting polymer is reactive with sulfur in a curing reaction which is analogous in some ways to the vulcanization of rubber, but is sharply different in other ways.

In practicing the invention, the polymer is cyclicized by a treatment thereof with such substances as stannic chloride, aluminum tribromide, sulfuric acid or the various organic sulfonic acids and the like.

For the cyclicizing step the polymer may be dissolved in a suitable solvent such as dry benzol or dry petroleum naphtha and the cyclicizing agent applied to the solution. Alternatively, the polymer may be worked on the open roll mill and the cyclicizing agent such as the metal halide, mixed into the polymer on the mill at room temperature or somewhat above; then heating the mixture in a suitable oven to a temperature of approximately 100° C. for approximately 20 minutes. Alternatively, cyclization can be obtained by milling the polymer and milling in an organic sulfonic acid; followed by heating to approximately 100° C. for from 15 to 150 minutes.

The resulting cyclicized polymer is desirably used in the form of a cement prepared by dissolving the cyclicized polymer in a suitable solvent such as benzene, toluol, xylene, cyclohexane, methyl cyclohexane or mixtures of toluene with diisobutylene or the like. The solution as so prepared is then applied to the surface to which the rubber is to adhere; the solvent is allowed to evaporate and the rubbery material is then applied and cured in situ to yield the desired adherent rubbery covering.

EXAMPLE 1

A quantity of poly methyl pentadiene was prepared, as above described, and 20 parts by weight were dissolved in 250 parts by weight of dry benzol ($C_6H_6$). When a good solution was obtained, it was treated at room temperature with approximately 2 parts by weight of stannic chloride in solution of 25 parts by weight of dry benzol. The mixture was well stirred and allowed to stand at room temperature for 24 hours. At the end of this time, the cyclicized polymer was precipitated from the solution by the addition of approximately 20 parts by weight of dry isopropyl alcohol. The polymer was then drained from the benzene and alcohol liquid and dried. The melting point of the cyclicized dry polymer was found to be 70° C.

Approximately 5 parts by weight of the cyclicized polymer were then dissolved in approximately 100 parts by weight of dry toluene (the toluene having been dried over sodium for 7 days). The polymer dissolved readily in the toluene to yield an excellent cement.

This cement was brushed over the surface to which it was desired to adhere other rubber-like bodies; the solvent was allowed to evaporate and a sheet of simple polyisobutylene was worked into contact with the cement-coated surface.

It may be noted that the cyclicized polymer is a relatively hard resinous material which is thermoplastic or fusible at temperatures between 70° C. and 100° C. The adhesion to the solid surface is due to its "surface acting power"; possible surface tension or the like. The polymer is preferably used without curing agents or fillers or other substances, although for some purposes small amounts of pigments, or fillers serve to increase the melting point somewhat and impart a somewhat stiffer body to the cyclicized polymer when it is warm. The material bonded to the metal by cyclicized polymer is treated in the usual manner. With the simple polyisobutylene, carbon black is usually desirably added to stiffen the polymer and improve its adhesion to the cyclicized polymer. The compound may conveniently be prepared on the open roll mill, the material sheeted out on the mill into the desired thickness of sheets and compounded material in sheet form applied to the solid to which it is to adhere. The whole structure is then preferably placed in a mold or the rubbery body supported in any convenient way and heated for the desired length of time. In view of the fact that the cyclicized polymer is quite soft to fluid at the cooling temperatures, considerable care is necessary to insure that the rubber sets in place and that the cyclicized polymer does not escape.

To obtain an evaluation of the tensile strength and adhesive power of the polymer, both to metal surfaces and to the surface of the polyisobutylene sheet, the Yerzley modification of the A. S. T. M. method No. D429-39-T was used. For this purpose a pair of edge threaded discs were prepared, each having an area of 2 sq. in. One side of each disc was then treated with a layer of the cement prepared as above pointed out. Thereafter a pad or lamina of polybutene compounded with approximately 100 parts of carbon black per 100 parts of polymer was interposed between the cement-coated surface of the two edge threaded discs. The assembly of discs, cyclicized polymer and polyisobutylene was then placed under a pressure of approximately 500 lbs. per square inch and heated to 76° C. for 120 minutes. The structure was then cooled to room temperature under the pressure and allowed to stand under pressure at room temperature for approximately 29 hours. The threaded discs were then attached to the jaws of a tensile strength testing machine (Olsen) and pulled apart, the tension required to separate them indicating the strength of the assemblage. In each instance the break occurred at least 90% within the polybutene lamina and 10% or less at the interface between the metal and the cyclicized polymer.

The following table shows the results obtained:

TABLE No. 1

| Sample No | 1 | 2 | 3 |
|---|---|---|---|
| Composition of Tank Lining. | ⅔ Spheron carbon black, ⅓ B100 Polybutene. | Same. | Same. |
| Adhesion Material | Cyclicized Polymethyl pentadiene. | Same. | Same. |
| Total Time of Cure under pressure. | 31 hours | Same. | Same. |
| Temperature of Cure | 76° C. for two hours then cooled to 25° C. | Same. | Same. |
| Temperature of Adhesion Test. | 25° C | Same. | Same. |
| A. S. T. M. Adhesion to steel in lbs./sq. inch. | 460 | 590 | 295. |

As shown in the above table, the material adhered to the metal surface or a compound of simple polyisobutylene prepared according to the following recipe:

Parts
Polyisobutylene (molecular weight 100,000) __ 100
Carbon black (spheron) _____ 200

If natural rubber is used, it is preferably compounded by a standard compounding formula to include such substances as sulfur, accelerators, zinc oxide, stearic acid and carbon black in the usual proportions. With the various synthetic rubber-like bodies, the usual compounding agents are preferably used. That is, with Buna S, the emulsion interpolymer of butadiene and styrene, the usual quantities of sulfur, carbon black, zinc oxide and accelerator are used. With Perbunan, which is the emulsion copolymer of butadiene with acrylonitrile, the usual compounding agents are also used; these being much the same as with Buna S.

With the low temperature interpolymer of isobutylene and a polyolefin, known as Butyl, the usual compounding agents including stearic acid, zinc oxide, carbon black and a curing agent such as sulfur with a curing aid of the type of Tuads (tetramethyl thiuram disulfide) or polyquinone dioxime or its esters or the like are conveniently used. With polychloroprene, known as neoprene, the usual compounding agents are also desirably added, including in this instance also carbon black, stearic acid, zinc oxide, sulfur and the accelerator.

In many instances, it is desirable to use a very potent accelerator or curing aid, curing at a relatively low temperature for a relatively long time, in order to avoid temperatures much above the softening point of the cyclicized polymer.

EXAMPLE 2

A low temperature polymer of isobutylene and a polyolefin was prepared as shown in Australian Patent No. 112,875, a mixture being prepared consisting of 97 parts of isobutylene of approximately 98% purity and 3 parts of isoprene of approximately 96% purity. This mixture was cooled to a temperature of approximately −100° C. by the addition thereto of 300 parts of liquid ethylene and was then polymerized by the addition thereto of approximately 10 parts of a solution of aluminum chloride 0.5% in ethyl chloride. The resulting copolymer was removed from the reaction mixture, brought up to room temperature and washed on the mill to remove impurities, including unreacted olefinic material and refrigerant as well as traces of catalyst. (This formula is representative of a wide range of materials, isoolefins of from 4 to 8 carbon atoms being useful and diolefins of from 4 to 12 or 14 carbon atoms being useful, whether conjugated or non-conjugated and whether having two or more olefinic linkages per molecule; as described in the Australian patent. The resulting polymer was found to have a molecular weight according to the Staudinger method of approximately 56,000 and an iodine number according to the Wijs method of approximately 2.

This material is a rubber substitute and like natural rubber, is a high molecular weight solid organic substance characterized by a substantial chemical unsaturation sufficient to combine with sulfur in a curing reaction, and when cured, an elongation at break under tension ranging from 200 to 1200%, a forcible retraction upon release of tension to approximately original size and shape and a tensile strength at break within the range between 500 lbs. per square inch and 5000 lbs. per square inch.

This material was compounded according to the following recipe:

TABLE 2.—*Butyl mix*

| | Parts |
|---|---|
| Butyl polymer (56,000 M. W. Staudinger) | 100 |
| Carbon black (Kosmos 20) | 100 |
| Stearic acid | 3 |
| Tetramethyl thiuram disulfide (Tuads) | 1 |
| Mercapto benzothiozole (Captax) | 0.5 |
| Sulfur | 5.0 |

It may be noted that this polymer when cured is completely saturated chemically and is highly resistant to acid, alkali and the oxygenated solvents generally. (Its resistance to chlorine is low and its resistance to hydrocarbon solvents is low.)

Accordingly, the surface to be protected was prepared as in Example 1, a portion of polymethyl pentadiene being cyclicized as above described, dissolved in solvent to form a cement and a layer of the cement brushed over the surface to which the isobutylene-butadiene polymer was to be adhered. The polymer prepared according to the recipe in Table 2 was then sheeted out on the mill to the desired thickness and applied to the dry layer of cyclicized polymer. The structure was then cured in a mold, the structure, including the metal support, the cyclized polymer coating and the compounded isoolefin-diolefin polymer, being held firmly together under a pressure of approximately 500 lbs. per square inch. The whole structure was then heated to a temperature of 150° C. for a time interval of 90 minutes to cure the copolymer. The mold was then cooled to room temperature, while still under pressure and the finished structure was then removed from the mold.

In order to obtain determinations of the adhesion and tensile strength of the structure, several pair of edge threaded discs were prepared as in Example 1, giving a surface of each disc a coating of the cyclicized polymer cement. Then a lamina or pad of the compounded polymer was placed between the cement coated surfaces of the discs, the assemblage was placed in a mold under 500 lbs. per square inch pressure and cured for the same time and temperature as the main structure. These test samples likewise were cooled under pressure in the mold and removed when cooled to room temperature.

They were then placed in the tensile strength machine and pulled apart to yield results shown in the following table:

TABLE 3.—*Butyl mix*

*Bonding butyl rubber to steel with cyclicized polymethylpentadiene*

Test sample No. 1___Bond broke at 450 lbs./sq. in.
Test sample No. 2___Bond broke at 425 lbs./sq. in.
Test sample No. 3___Bond broke at 475 lbs./sq. in.
Test sample No. 4___Bond broke at 512 lbs./sq. in.
Test sample No. 5___Bond broke at 455 lbs./sq. in.

These determinations show the excellent adhesion between the cyclicized polymer and the metal of the cyclicized polymer and the cured copolymer. In each instance, however, the bond broke in the film of cyclicized copolymer showing that the strength of the cyclicized polymer is less than the strength of the cured polymer.

EXAMPLE 3

A structure of yellow brass was coated with the cement of cyclicized polymethylpentadiene as above described and a similar copolymer of isobutylene and isoprene, as in Example 2, was adhered to the brass of a similar procedure; test samples being simultaneously prepared. These samples, upon testing for tensile strength, likewise gave excellent tensile strength as shown in Table 4:

TABLE 4

*Bonding butyl rubber to brass with cyclicized polymethylpentadiene*

Test sample No. 1___Bond broke at 400 lbs./sq. in.
Test sample No. 2___Bond broke at 215 lbs./sq. in.
Test sample No. 3___Bond broke at 430 lbs./sq. in.

In this instance also, the break occurred in the polymer film showing that the adhesion to the brass and to the olefinic copolymer was better than the tensile strength of the cyclicized polymer.

EXAMPLE 4

A mixture was prepared consisting of 50 parts by weight of natural rubber with 50 parts by weight of polymethylpentadiene prepared as above described, having a molecular weight according to the Staudinger method of 32,000. This material was compounded according to the following recipe:

TABLE 5

*Hyrocarbon mix No. 5519-2*

| | Parts |
|---|---|
| 50% rubber, 50% polymethylpentadiene | 100 |
| Zinc oxide, ZnO | 5 |
| Stearic acid | 1 |
| Sulfur | 2.5 |
| Carbon black (Cabot #9) | 50.0 |
| Captax (mercapto benzothiozole) | 1.2 |

A steel structure was coated with a layer of the cyclicized polymethylpentadiene cement as above pointed out, the rubber and polymer mixture compounded as in Table 5 was sheeted out and the sheet applied to the cement-coated surface. The structure was then placed in a mold and cured under heat and pressure as before.

In order to determine the physical properties of the several elements of this structure, a portion of the rubber-polymer mixture was cured in a test mold and determinations made of the tensile strength of the mixture. The test values are shown in Table 6:

TABLE 6

*Properties of "rubber, polymethylpentadiene" mixture when vulcanization was conducted at 285° F.*

| Time of Cure | Modulus at 300% Elongation | Tensile Lbs. per Square Inch | Elongation at Break, Per cent |
|---|---|---|---|
| 30 min | 1,400 | 1,775 | 420 |
| 50 min | 1,525 | 1,745 | 320 |
| 70 min | 1,500 | 1,740 | 360 |

Simultaneously, edge threaded discs were prepared with coatings of cement prepared as above described and were placed on opposite sides of a pad or lamina of the rubber-polymer mixture and cured under pressure as above described. Upon determination of tensile strength as before, the results shown in Table 7 were obtained:

TABLE 7.—*Hydrocarbon mix*

*Bonding mixture to steel with cyclicized polymethylpentadiene*

Test Sample No. 1__ Bond broke at 515 lbs./sq. in.
Test Sample No. 2__ Bond broke at 420 lbs./sq. in.

These determinations again show the excellent strength of the bond obtained and the high value of the cyclicized polymer as an adhesive between a solid surface and a rubbery material.

It may be noted that in this instance the cyclicized polymethylpentadiene had a molecular weight according to the Staudinger method of approximately 6000; the cement contained 5% of the cyclicized polymer in solution, and the curing for the several structures was conducted for 50 minutes at 140° C.

EXAMPLE 5

Similar structures utilizing Buna S, adhered to steel, were conducted; with similar test pieces, which were found to yield similar results. The Buna was compounded according to the following recipe:

| | Parts |
|---|---|
| Butadiene-styrene polymer | 100 |
| Stearic acid | 5 |
| Zinc oxide | 5 |
| Carbon black | 25 |
| Sulfur | 3 |
| Tuads (tetramethyl thiuram disulfide) | 1 |

The structure was prepared as above described and cured for approximately 60 minutes at a temperature of approximately 135° C.

Simultaneously test samples were prepared as before, which upon testing for tensile strength, showed strengths varying between 450 and 500 lbs. to the square inch, breakage occurring as before in the film of cyclicized polymethylpentadiene.

These results are representative of the several forms of Buna, both a simple polybutadiene prepared either by emulsion polymerization or by mass polymerization with sodium; and Perbunan, the interpolymer of butadiene and acrylonitrile, as well as the Buna S, above shown.

These results also are representative of similar results obtained with the polychloroprene known as Duprene and with the reaction product from ethylene dichloride and sodium polysulfide known as Thiokol, which behaves in much the same manner as does simple polyisobutylene.

The material is also highly effective for adhering a wide range of resinous polymers to metals and other solid surfaces; such polymer resins as Bakelite, the interpolymer of phenol and formaldehyde, the several polymethacrylate resins, the several glyptol resins and the like, all being firmly adherent to films of cyclicized polymer which in turn is, as above pointed out, highly adherent to metals and solid surfaces.

The cyclicized polymethylpentadiene shows the unusual and unique property of being adherent both to metals and to substantially all of the high molecular weight polymeric or resinous type of organic compounds, whether rubbery in nature or thermoplastic in nature, or heat setting in nature, and accordingly the scope of the invention includes the use of the cyclicized polymer as an adhesive between a solid surface of any type and any high molecular weight organic substance which is thermoplastic or rubbery in type.

In the appended claims the word "resin" is used, and for the purposes of this application, the word "resin" is defined as any organic material which is solid, has a substantial molecular weight, above about 1000 and a substantial tensile strength above 100 pounds per square inch and the word "resin" is defined to include natural rubber, all of the rubber-like bodies, whether rubber substitutes or synthetic rubbery substances, and all of the synthetic organic polymers, of which Bakelite and the polymethacrylate polymers are representative, and all of the natural resins such as copal, gum damar, shellac and the like.

In some of the claims the word "resin" is qualified by the word rubber, and this phrase is herewith defined for the purposes of this specification as meaning natural rubber and all of the synthetic rubber substances which are high molecular weight linear chain carbon compounds characterized by solidity, flexibility, plasticity and elasticity, a sufficient unsaturation to combine with sulfur in a curing reaction, and when cured, an elongation at break under tension ranging from 200% to 1200%, a tensile strength at break ranging from 500 to 5000 lbs. per square inch and a forcible retraction upon release of tension to original size and shape.

Thus the invention provides a new and useful means for causing adherence between a surface of any type, particularly a metal surface, and a resin body or a rubbery resin body by the interposition therebetween of a film or layer of a cyclicized polymethylpentadiene.

While there are above disclosed but a limited number of embodiments of the process and product of the invention, it is possible to produce still other embodiments without departing from the inventive concept herein disclosed and it is therefore desired that only such limitations be imposed on the appended claims as are stated therein or required by the prior art.

The invention claimed is:

1. A structure comprising a base solid, a resin body attached thereto and adhesive film therebetween comprising a cyclicized polymethylpentadiene.

2. A structure comprising a metallic body, a resinous member attached thereto and an interposed adhesive layer therebetween, comprising a cyclicized polymethylpentadiene.

3. A structure comprising a metallic body, a rubbery resinous member attached thereto and an interposed adhesive layer therebetween, comprising a cyclicized polymethylpentadiene.

4. A structure comprising a metal member, an adherent layer of cyclicized substituted polypentadiene and a layer of rubber adherent thereto.

5. A structure comprising a metal member, an adherent layer of cyclicized polymethylpentadiene and a layer of synthetic rubber adherent thereto.

6. A structure comprising a metal member, an adherent layer of cyclicized polymethylpentadiene and a layer of synthetic rubber adherent thereto, comprising an emulsion polymer of butadiene.

7. A structure comprising a metal member, an adherent layer of cyclicized polymethylpentadiene and a layer of synthetic rubber adherent thereto, comprising an emulsion polymer of butadiene and styrene.

8. A structure comprising a metal member, an adherent layer of cyclicized polymethylpentadiene and a layer of synthetic rubber adherent thereto, comprising an emulsion polymer of butadiene and acrylonitrile.

9. A structure comprising a metal member, an adherent layer of cyclicized polymethylpentadiene and a layer of synthetic rubber adherent thereto comprising a polymer of isobutylene and a polyolefin having 4 to 14 carbon atoms, inclusive.

10. A structure comprising a metal member, an adherent layer of cyclicized polymethylpentadiene and a layer of synthetic rubber adherent thereto comprising a polymer of isobutylene and a polyolefin having 4 to 14 carbon atoms, inclusive, prepared at temperatures between $-40°$ C. and $-160°$ C. by the application to the olefins of a Friedel-Crafts catalyst in solution in a low-freezing, non-complex forming solvent.

11. The method of preparing a laminar structure of metal and a resin comprising the steps of cyclicizing a polymethylpentadiene, dissolving the cyclicized polymer in a solvent, applying the solution to a metal surface, evaporating the solvent and contacting the resin with the cyclicized polypentadiene from the solution.

12. The process of preparing a laminar structure comprising the steps of cyclicizing polymethylpentadiene, applying it to a metal member and adhering a rubbery resin body to the surface of the cyclicized polypentadiene.

13. The method of preparing a laminar structure comprising the steps of cyclicizing a polymethylpentadiene, applying a layer of the cyclicized polymer to a metal structure and curing a rubbery resin body in contact with the cyclicized polymer.

JOHN D. CALFEE.
DAVID W. YOUNG.

REFERENCES CITED

The following references are of record in the file of this patent:

UNITED STATES PATENTS

| Number | Name | Date |
|---|---|---|
| 1,697,275 | Gray | Jan. 1, 1929 |
| 1,732,886 | Gray | Oct. 22, 1929 |
| 1,744,880 | Geer | Jan. 28, 1930 |
| 2,099,318 | Sebrell | Nov. 16, 1937 |

OTHER REFERENCES

Bonding, by B. J. Habgood, Institute of the Rubber Industry, August 1937, volume 13, page 154.

Pages 1033–1037, Industrial and Engineering Chemistry, September 1927.